US008000826B2

(12) United States Patent
Luo et al.

(10) Patent No.: US 8,000,826 B2
(45) Date of Patent: Aug. 16, 2011

(54) PREDICTING IC MANUFACTURING YIELD BY CONSIDERING BOTH SYSTEMATIC AND RANDOM INTRA-DIE PROCESS VARIATIONS

(75) Inventors: Jianfeng Luo, Fremont, CA (US); Subarnarekha Sinha, Foster City, CA (US); Qing Su, Sunnyvale, CA (US); Charles C. Chiang, San Jose, CA (US)

(73) Assignee: Synopsys, Inc., Mountain View, CA (US)

( * ) Notice: Subject to any disclaimer, the term of this patent is extended or adjusted under 35 U.S.C. 154(b) by 661 days.

(21) Appl. No.: 11/339,184

(22) Filed: Jan. 24, 2006

(65) Prior Publication Data

US 2007/0174797 A1   Jul. 26, 2007

(51) Int. Cl.
*G06F 11/00* (2006.01)
*G06F 19/00* (2011.01)
*G05B 11/01* (2006.01)
*H01L 23/58* (2006.01)
*G06K 9/00* (2006.01)

(52) U.S. Cl. .............. 700/95; 714/30; 257/48; 382/141; 382/149; 382/151; 382/154

(58) Field of Classification Search ............... 700/95, 700/21; 257/48; 382/141, 149, 151, 154; 714/30
See application file for complete search history.

(56) References Cited

U.S. PATENT DOCUMENTS

| | | | | |
|---|---|---|---|---|
| 4,475,122 A * | 10/1984 | Green | ............................ | 348/87 |
| 4,543,659 A * | 9/1985 | Ozaki | ............................ | 382/145 |
| 5,430,734 A * | 7/1995 | Gilson | ............................ | 714/725 |
| 5,497,381 A * | 3/1996 | O'Donoghue et al. | ........ | 714/745 |
| 5,648,661 A * | 7/1997 | Rostoker et al. | ................ | 257/48 |
| 6,169,960 B1 * | 1/2001 | Ehrichs | ............................ | 702/36 |
| 6,283,829 B1 * | 9/2001 | Molnar | ............................ | 451/8 |
| 6,434,725 B1 * | 8/2002 | Sommer et al. | ................... | 716/4 |
| 6,720,194 B1 * | 4/2004 | Miller et al. | .................... | 438/14 |
| 6,933,523 B2 * | 8/2005 | Sheck | ............................ | 257/48 |
| 7,081,635 B2 * | 7/2006 | Baumann | ................... | 250/493.1 |
| 7,220,990 B2 * | 5/2007 | Aghababazadeh et al. | ..... | 257/48 |
| 2006/0066339 A1 * | 3/2006 | Rajski et al. | .................. | 324/765 |

OTHER PUBLICATIONS

Mangassarian et al., "On Statistical Timing Analysis with Inter-and Intra-Die Variations" IEEE, Mar. 2005 p. 132-137.*
Agarwal et al., "Statistical Timing Analysis for Intra-Die Process Variations with Spatial Correlations", ACM 2003, p. 900-907.*
Boning et al., "Statistical Metrology of Interlevel Dielectric Thickness Variation". 1994, SPIE Symposium on Microelectronic Manufacturing, p. 316-327.*

* cited by examiner

*Primary Examiner* — Albert Decady
*Assistant Examiner* — Thomas Stevens
(74) *Attorney, Agent, or Firm* — Park, Vaughan, Fleming & Dowler LLP

(57) ABSTRACT

One embodiment of the present invention provides a system that predicts manufacturing yield for a die within a semiconductor wafer. During operation, the system first receives a physical layout of the die. Next, the system partitions the die into an array of tiles. The system then computes systematic variations for a quality indicative value to describe a process parameter across the array of tiles based on the physical layout of the die. Next, the system applies a random variation for the quality indicative parameter to each tile in the array of tiles. Finally, the system obtains the manufacturing yield for the die based on both the systematic variations and the random variations.

18 Claims, 7 Drawing Sheets

PREDICTING IC MANUFACTURING YIELD BY CONSIDERING BOTH SYSTEMATIC AND RANDOM INTRA-DIE PROCESS VARIATIONS

BACKGROUND

1. Field of the Invention

The present invention relates to techniques for predicting manufacturing yield for integrated circuit fabrication processes. More specifically, the present invention relates to a method and apparatus for predicting manufacturing yield for integrated circuit fabrication processes by considering both systematic and random intra-die variations.

2. Related Art

Dramatic improvements in semiconductor integration circuit (IC) technology presently make it possible to integrate tens of millions of transistors, onto a single semiconductor IC chip. These improvements in integration densities have largely been achieved through corresponding improvements in semiconductor manufacturing technologies, which have recently achieved deep-submicron feature sizes.

On the flip side, the constant drive towards ever-decreasing feature sizes has led to a significant increase in manufacturing cost. One of the main causes of this increase in manufacturing costs is a significant decrease in manufacturing yield due to manufacturing losses. Therefore, it is extremely desirable to be able to predict manufacturing yield at the design stage. This enables corrections and improvements to be made during the design stage to improve the ultimate manufacturing yield.

IC manufacturing processes typically involve complex physical and chemical interactions. Because it is impossible to perfectly control these complex physical and chemical interactions, process parameters associated with these manufacturing processes tend to fluctuate around their nominal values, causing "process parameter variations." Such process parameter variations can significantly reduce manufacturing yield.

In conventional systems, process parameter variations and the associated yield issues are taken into account, without considering the physical layout of a chip. This methodology is sufficient when the lot-lot, wafer-wafer and die-die variations dominate the overall process parameter variations. However, because of the recent reductions in feature size, intra-die parameter variations at the feature level are becoming increasingly more significant in determining manufacturing yield.

Specifically, a number of systematic intra-die variations have been observed as a function of layout patterns. In particular, two examples are: (1) intra-die critical dimension (CD) variations in the microlithography process and (2) copper (Cu) thickness and oxide thickness variations in the chemical-mechanical planarization (CMP) process. Empirical data shows that systematic intra-die CD and Cu thickness variations due to the layout pattern non-uniformity are becoming comparable to variations caused by lot-lot, wafer-wafer and die-die variations. This is a problem because conventional techniques for predicting yield do not consider these intra-die variations. Intra-die variations have a strong layout dependent component. To account for intra-die variations, it is necessary to look at compensation of the design at the design stage. Hence it is desirable to have a manufacturing yield prediction model.

To reduce the above-mentioned process variations, design for manufacturing/yield (DFM/DFY) technologies, such as: optical proximity correction (OPC), phase shifting mask (PSM), scattering assistant bar and the dummy filling (DF) have been introduced into IC design flows. Additionally, various full-chip simulation tools have been developed to evaluate systematic intra-die variations.

In addition to systematic intra-die variations, random intra-die variations are another important component of total intra-die variations. Specifically, random intra-die variations create random fluctuations of a process parameter at different locations within a die in a random statistical manner.

Furthermore, the random intra-die variations tend to be spatially correlated. Typically, when the lot-lot, wafer-wafer, and die-die random variations dominate the overall random variations, a perfect spatial correlation (~1) of the random variations across each die can be assumed. However, due to increasing die-size and more-significant random intra-die variations, the spatial correlations of the random variations between two intra-die locations are not perfect, but instead decrease with the distances between the locations. These non-perfect correlations between intra-die locations can strongly affect the total manufacturing yield.

Unfortunately, neither random intra-die variations nor the associated spatial correlations of the random intra-die variations have been taken into account while predicting the IC manufacturing yield.

Hence, what is needed is a method and an apparatus for predicting IC manufacturing yield without the above-described problems.

SUMMARY

One embodiment of the present invention provides a system that predicts manufacturing yield for a die within a semiconductor wafer. During operation, the system first receives a physical layout of the die. Next, the system partitions the die into an array of tiles. The system then computes systematic variations for a quality indicative value to describe a process parameter across the array of tiles based on the physical layout of the die. Next, the system applies a random variation for the quality indicative parameter to each tile in the array of tiles. Finally, the system obtains the manufacturing yield for the die based on both the systematic variations and the random variations.

In a variation on this embodiment, the system obtains the manufacturing yield for the die by: receiving specification limits for the quality indicative value; computing probability values for all the tiles in the die and which indicate whether the die satisfies the specification limits based on both systematic variations and random variations. The system then obtains the manufacturing yield for the die from these probability values.

In a variation on this embodiment, the system computes the systematic variations by performing a physical layout extraction across the array of tiles and obtaining a nominal value for the quality indicative parameter for each tile based on the physical layout extraction.

In a variation on this embodiment, the system applies a random variation to each tile by applying a random distribution around the nominal value of the quality indicative value for each tile to represent random fluctuations of the quality indicative parameter for the tile.

In a variation on this embodiment, the system predicts the manufacturing yield for the die even more accurately by: obtaining spatial correlations for the random variations between the tiles; and then obtaining the manufacturing yield for the die based on the systematic variations, the random variations and the spatial correlations of the random variations.

In a further variation on this embodiment, the system computes the spatial correlation for the random variations between the tiles by obtaining measurement data from test structures and extracting correlation coefficients as a function of the distance between the tiles from the measurement data.

In a further variation on this embodiment, the correlation coefficients are used to construct a covariance matrix for the array of tiles, wherein the covariance matrix contains data which indicates spatial correlations between the tiles.

In a further variation on this embodiment, the system predicts the manufacturing yield for the die by using "windows" to select only a subset of the tiles to analyze, and thereby to reduce computation complexity. More specifically, the system selects a window with a specific geometry and size which is larger than a single tile. Next, the system selects a first tile from the array of tiles which satisfies a criterion. The system then places a first instance of the window around the first tile and iteratively: (1) selects a tile from the array of tiles which also satisfies the criterion and is not covered by an instance of the window; (2) places a new instance the window around the tile; and (3) repeats the above two steps until the entire die is covered by instances of the window. Next, the system computes spatial correlations for the random variations between all of the selected tiles. Finally, the system obtains the manufacturing yield for the die based on the systematic variations, the random variations and the spatial correlation of the random variations between the selected tiles.

In a further variation on this embodiment, the criterion is either a maximum nominal value or a minimum nominal value for the quality indicative parameter.

In a further variation on this embodiment, the window size is determined such that any two locations within the window have a spatial correlation coefficient that is sufficiently close to unity.

Table 1 shows the yield prediction results under different perfect-correlation distances.

DETAILED DESCRIPTION

Integrated Circuit Design Flow

Figure 1:
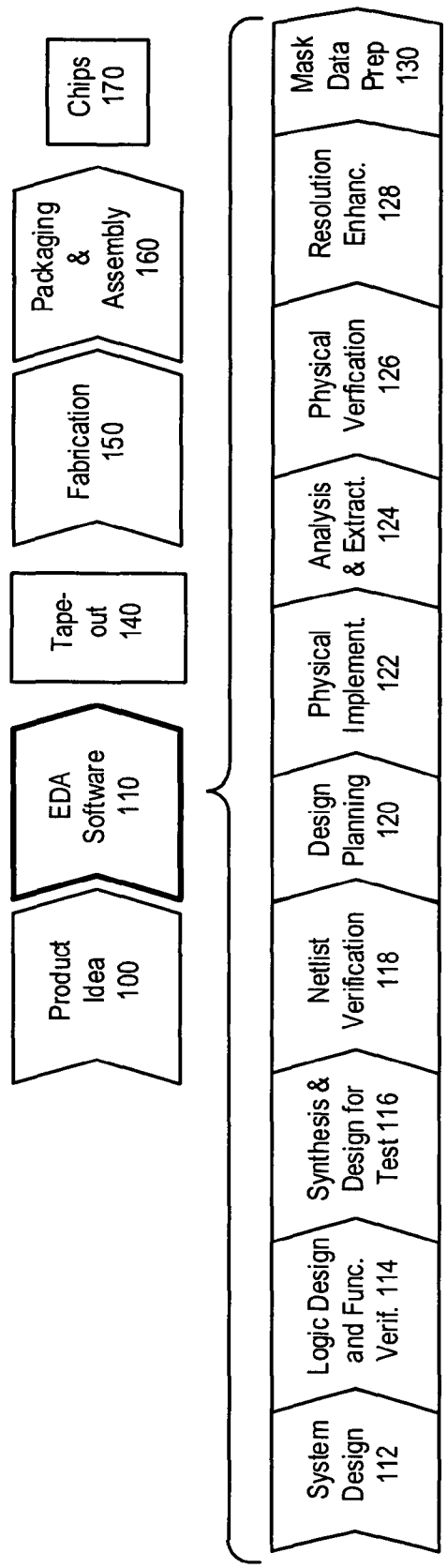
FIG. 1 illustrates various steps in the design and fabrication of an integrated circuit in accordance with an embodiment of the present invention.

FIG. 1 illustrates various steps in the design and fabrication of an integrated circuit in accordance with an embodiment of the present invention.

The process starts with the product idea (step 100) which is realized using an EDA software design process (step 110). When the design is finalized, it can be taped-out (event 140). After tape out, the fabrication process (step 150) and packaging and assembly processes (step 160) are performed which ultimately result in finished chips (result 170).

The EDA software design process (step 110), in turn, comprises steps 112-130, which are described below. Note that the design flow description is for illustration purposes only. Specifically, this description is not meant to limit the present invention. For example, an actual integrated circuit design may require the designer to perform the design steps in a different sequence than the sequence described below. The following text provides a brief description of the steps in the design process (step 110).

System design (step 112): The designers describe the functionality that they want to implement, they can perform what-if planning to refine functionality, check costs, etc. Hardware-software architecture partitioning can occur at this stage. Exemplary EDA software products from Synopsys, Inc. that can be used at this step include Model Architect, Saber, System Studio, and DesignWare® products.

Logic design and functional verification (step 114): At this stage, the VHDL or Verilog code for modules in the system is written and the design is checked for functional accuracy. More specifically, the design is checked to ensure that it produces the correct outputs. Exemplary EDA software products from Synopsys, Inc. that can be used at this step include VCS, VERA, DesignWare®, Magellan, Formality, ESP and LEDA products.

Synthesis and design for test (step 116): Here, the VHDL/Verilog is translated to a netlist. The netlist can be optimized for the target technology. Additionally, the design and implementation of tests to permit checking of the finished chip occurs. Exemplary EDA software products from Synopsys; Inc. that can be used at this step include Design Compiler®, Physical Compiler, Test Compiler, Power Compiler, FPGA Compiler, Tetramax, and DesignWare® products.

Netlist verification (step 118): At this step, the netlist is checked for compliance with timing constraints and for correspondence with the VHDL/Verilog source code. Exemplary EDA software products from Synopsys, Inc. that can be used at this step include Formality, PrimeTime, and VCS products.

Design planning (step 120): Here, an overall floorplan for the chip is constructed and analyzed for timing and top-level routing. Exemplary EDA software products from Synopsys, Inc. that can be used at this step include Astro and IC Compiler products.

Physical implementation (step 122): The placement (positioning of circuit elements) and routing (connection of the same) occurs at this step. Exemplary EDA software products from Synopsys, Inc. that can be used at this step include the Astro and IC Compiler products.

Analysis and extraction (step 124): At this step, the circuit function is verified at a transistor level, this in turn permits what-if refinement. Exemplary EDA software products from Synopsys, Inc. that can be used at this step include AstroRail, PrimeRail, Primetime, and Star RC/XT products.

Physical verification (step 126): At this step various checking functions are performed to ensure correctness for: manufacturing, electrical issues, lithographic issues, and circuitry. Exemplary EDA software products from Synopsys, Inc. that can be used at this step include the Hercules product.

Resolution enhancement (step 128): This step involves geometric manipulations of the layout to improve manufacturability of the design. Exemplary EDA software products from Synopsys, Inc. that can be used at this step include Proteus, ProteusAF, and PSMGen products.

Mask data preparation (step 130): This step provides the "tape-out" data for production of masks to produce finished chips. Exemplary EDA software products from Synopsys, Inc. that can be used at this step include the CATS(R) family of products.

Note that embodiments of the present invention can be used during one or more of the above described steps. Specifically, one embodiment of the present invention can be used during the physical verification step 126.

Incorporating Intra-die Manufacturing Yield Prediction in EDA

Figure 2:
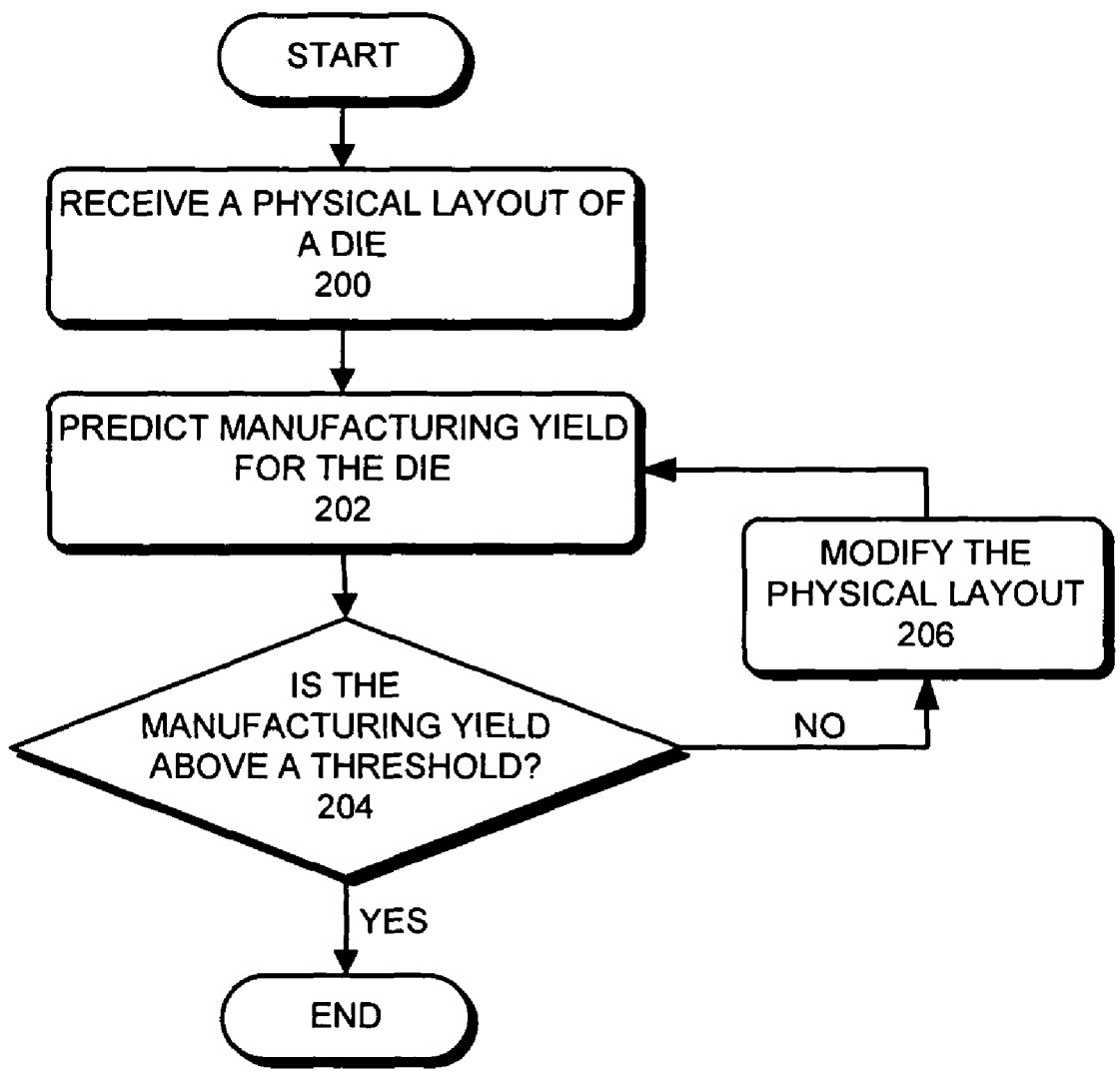
FIG. 2 presents a flowchart illustrating the process of incorporating manufacturing yield prediction for a die within a semiconductor wafer into a typical EDA design flow in accordance with an embodiment of the present invention.

FIG. 2 presents a flowchart illustrating the process of incorporating manufacturing yield prediction for a die within a semiconductor wafer into a typical EDA design flow in accordance with an embodiment of the present invention.

During operation, the system starts by receiving a physical design layout of a chip die (step 200). Referring back to FIG. 1, the physical design layout is typically generated during physical implementation (step 122) using the "place-and-route" tools. Next, the system performs a manufacturing yield prediction for the die (step 202). Note that the manufacturing yield prediction is typically performed on certain quality indicative parameters (e.g., the intra-die critical dimension (CD)) which are functions of the layout features. The system then determines whether the computed manufacturing yield is above a specified yield threshold (step 204). If so, the system proceeds to subsequent steps in the EDA design flow. On the other hand, if the system determines that the computed manufacturing yield is below the yield threshold, the system then performs proper modifications to the physical design layout (step 206) and recomputes the manufacturing yield for the die. Note that the above intra-die manufacturing yield prediction process can take place before or after the conventional physical verification step 126 in FIG. 1. Alternatively, it can be incorporated into step 126 in FIG. 1 as an expanded physical verification step.

Performing Manufacturing Yield Prediction

Figure 3:
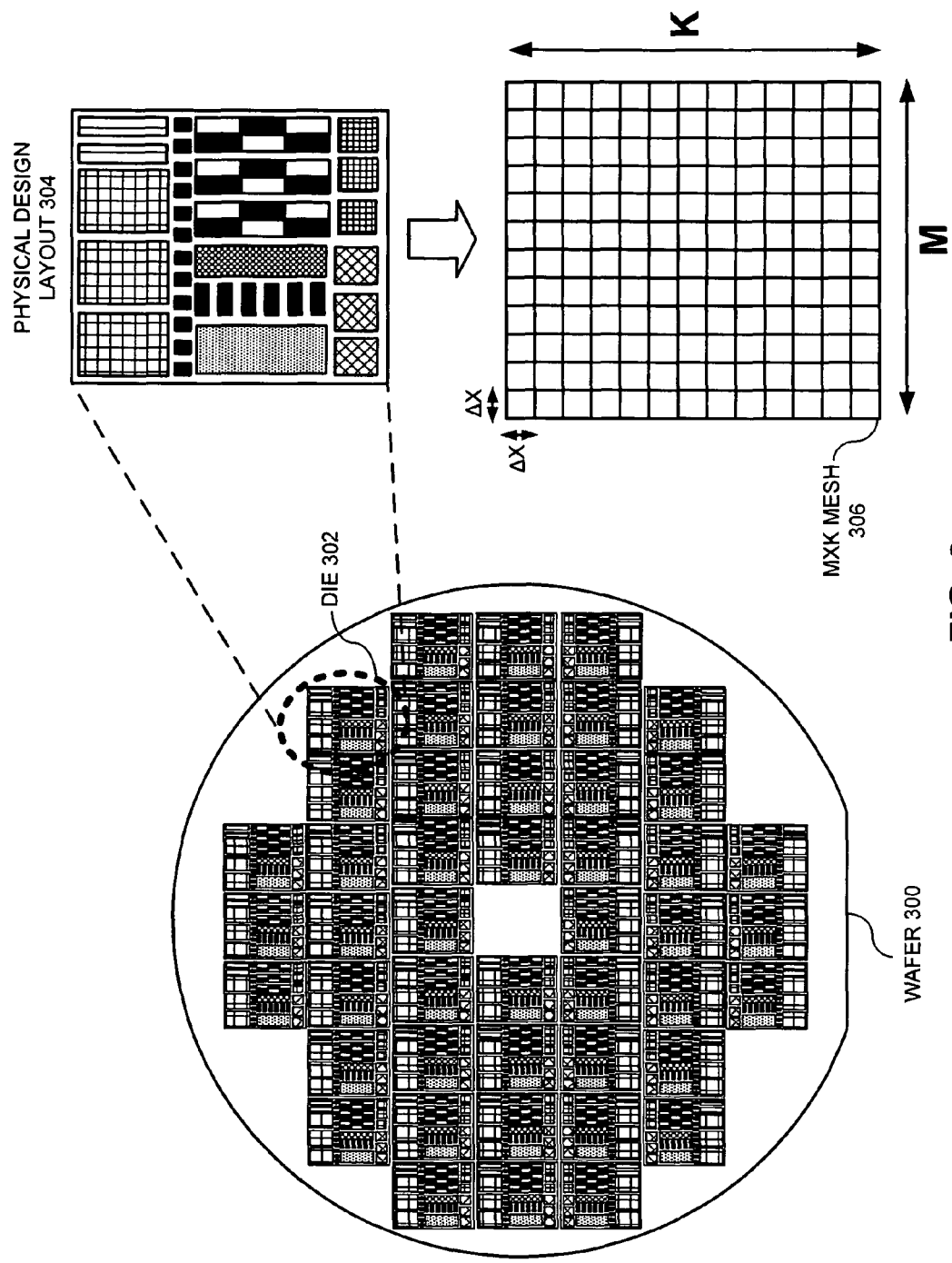
FIG. 3 illustrates a typical semiconductor wafer patterned with identical chip dies in accordance with an embodiment of the present invention.

FIG. 3 illustrates a typical semiconductor wafer 300 patterned with identical chip dies in accordance with an embodiment of the present invention. Each die 302 further contains numerous layout features illustrated by a more-detailed physical design layout 304.

Figure 4A:
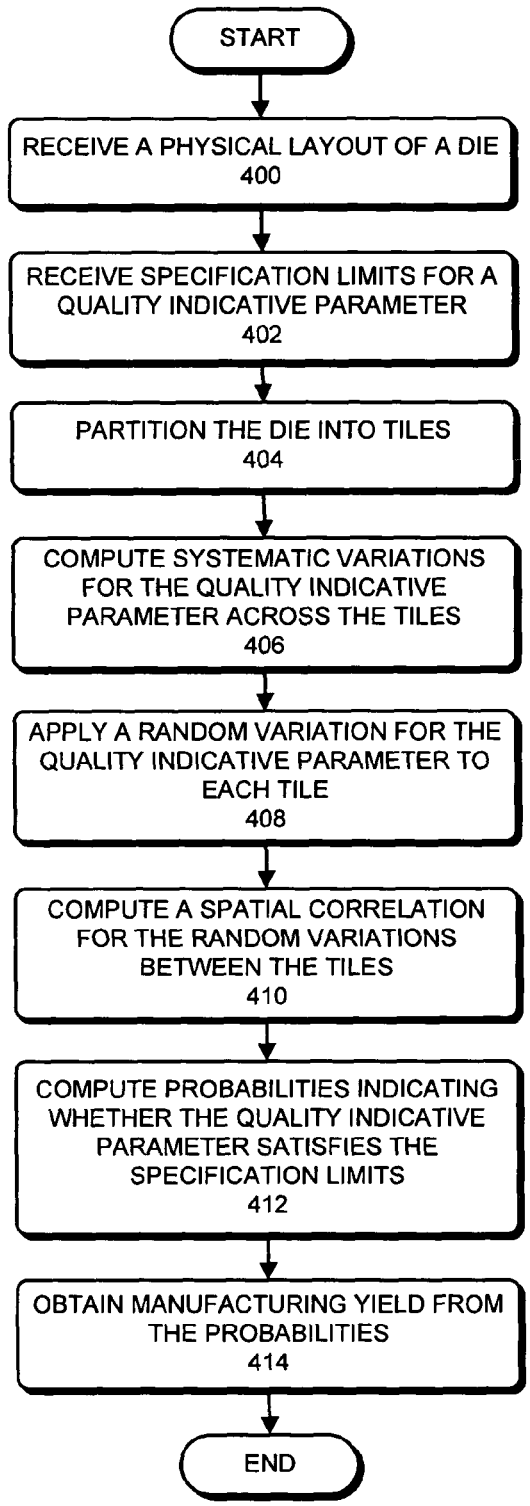
FIG. 4A presents a flowchart illustrating the process of predicting a manufacturing yield for a die within a semiconductor wafer in accordance with an embodiment of the present invention.

FIG. 4A presents a flowchart illustrating the process of predicting manufacturing yield for a die within a semiconductor wafer in accordance with an embodiment of the present invention. Note that this manufacturing yield may be determined based on different chip manufacturing rules and criteria. In one embodiment of the present invention, the manufacturing yield is associated with a quality indicative parameter, wherein the quality indicative parameter and subsequently the manufacturing yield can be affected by:

Systematic intra-die variations;
Random variations (both intra-die and inter-die are considered); and
Spatial correlation of the random variations.

Due to above variations, the quality indicative parameter can vary across a range of values. In one embodiment of the present invention, a designer can specify specification limits for the quality indicative parameter which can be used to determine the manufacturing yield.

During operation, the system first receives a physical design layout of the die (step 400). For example, in FIG. 3 the system obtains physical design layout 304 of die 302. The system additionally receives specification limits for the quality indicative parameter (step 402), wherein the specification limits can be an upper bound and/or a lower bound.

Next, the system partitions the die into an array of tiles (step 404). In one embodiment of the present invention, the system can partition the die into an array of squares. For example in FIG. 3, die 302 is partitioned into an M×K square mesh 306, wherein each tile in the mesh has a size of ΔX. Note that the size of the tile determines the resolution of the partition.

Figure 4B:
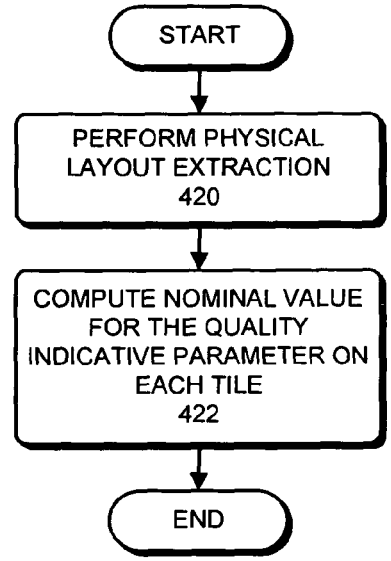
FIG. 4B presents a flowchart illustrating the process of computing the systematic intra-die variations in accordance with an embodiment of the present invention.

The system then computes the systematic intra-die variations for the quality indicative parameter across the array of tiles based on the physical layout of the die (step 406). Specifically, FIG. 4B presents a flowchart illustrating the process of computing the systematic intra-die variations in accordance with an embodiment of the present invention. The system first performs a physical layout extraction across the array of tiles (step 420). The results of the layout extraction are then fed into a simulator to compute a nominal value for the quality indicative parameter on each tile (step 422). The distribution of the nominal values for the quality indicative parameter across the die represents the systematic intra-die variations for the quality indicative parameter.

Next, as is illustrated in FIG. 4A, the system applies a random variation for the quality indicative parameter to each tile in the array of tiles (step 408). More specifically, this step involves applying a random distribution around the nominal value of the quality indicative parameter for each tile to represent the random fluctuations of the quality indicative parameter at the tile. In one embodiment of the present invention, a normal distribution can be used to represent the random fluctuations. Each normal distribution is associated with a variance ($\sigma^2$) around the nominal value, which can be obtained from the manufacturing data. However, one can choose to use other random distribution functions if necessary.

Figure 4C:
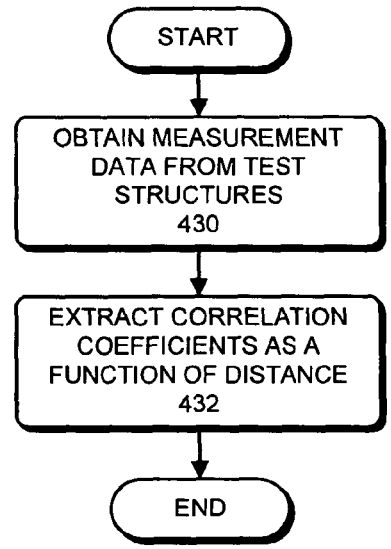
FIG. 4C presents a flowchart illustrating the process of computing the spatial correlations for the random variations in accordance with an embodiment of the present invention.

The system next computes spatial correlations for the random variations between the tiles (step 410). Specifically, FIG. 4C presents a flowchart illustrating the process of computing spatial correlations for the random variations in accordance with an embodiment of the present invention. The process starts by obtaining measurement data of the process parameter from test structures fabricated on multiple dies on multiple wafers (step 430). In one embodiment, one can use test structures similar to those in reference "Electrical linewidth metrology for systematic CD variation characterization and causal analysis," by J. P. Cain and C. J. Spanos, *Proceedings of SPIE*, Vol. 5038, pp. 350-361, 2003. The system then extracts correlation coefficients as a function of distances between the tiles from the measurement data (step 432). In one embodiment of the present invention, the correlation coefficients can be obtained as a function of distance by data fitting.

Note that the spatial correlations of the random variations are associated with specific manufacturing process. Hence the correlation coefficients can be obtained once and reused repeatedly for different designs manufactured using the same process.

Next, the correlation coefficients can be used to construct a covariance matrix for the array of tiles, wherein the covariance matrix contains parameters which indicate spatial correlations between the tiles. Note that this covariance matrix has a dimension of M×K by M×K, which can be extremely large if M×K is large.

Intuitively, the correlation coefficient increases and approaches unity when the distance between two locations decreases, whereas the correlation coefficient drops monotonically as the distance between the two locations increases.

The process of FIG. 4A next-computes probability values for all the tiles in the die indicating whether the selected quality indicative parameter satisfies the specification limits (step 412). This computation involves using the previously obtained data of the systematic variations, the random variations and the spatial correlations of the random variations. More specifically, the probability computation involves performing an M×K-dimensional integration using the nominal values of the process parameter on each tile, the random distributions, and the covariance matrix reflecting the spatial correlations between the tiles. A more-detailed description of the probability computation is provided below.

As a final step in FIG. 4A, the system obtains the manufacturing yield for the die based on the probability values (step 414). In one embodiment of the present invention, the specification limits comprises an upper-specification limit (USL) and a lower-specification limit (LSL). Consequently, the manufacturing yield is the probability that the quality indicative parameter across the die falls between these two specification limits.

Computing the Manufacturing Yield

Mathematically, if n represents the number of locations, then a random variable p representing a quality indicative parameter at the n locations can be represented by an n-dimensional random variable vector p, which can be written as:

$$p = \mu + \epsilon,$$

wherein $\mu$ is an n-dimensional vector representing the systematic variation components of the variable vector p and $\epsilon$ is an n-dimensional vector representing the random variation components of the variable vector p.

In one embodiment of the present invention, $\epsilon$ satisfies a multivariate normal distribution $N(0, \Sigma)$, where $\Sigma$ is a n×n covariance matrix of $\epsilon$. Accordingly, p satisfies a multivariate normal distribution $N(\mu, \Sigma)$. In one embodiment of the present invention, it is further assumed that the variances $\sigma^2$ of $\epsilon$ at all of the n locations are equal to each other. Then the correlation matrix $\rho$ at the location (i,j) is given by:

$$\rho_{i,j} = \Sigma_{i,j}/\sigma^2.$$

In one embodiment of the present invention, we further assume that the correlation between the random variation components at any two locations across a die is a function of the distances between the two locations, i.e., when the distances between two different pairs of locations, say $\{(x_1, y_1)$ and $(x_2, y_2)\}$ and $\{(x_3, y_3)$ and $(x_4, y_4)\}$ are equal to each other, the correlation between locations $(x_1, y_1)$ and $(x_2, y_2)$ will be equal to that between $(x_3, y_3)$ and $(x_4, y_4)$.

If the covariance matrix $\Sigma$ is full-rank, the probability Y that the values of the quality indicative parameter p at all n locations fall between the previously-defined USL and LSL is:

$$Y = \int_L^U \int_L^U \int_L^U \ldots \Phi(p) \, dp_1 \, dp_2 \ldots dp_n$$

$$= \int_L^U \int_L^U \int_L^U \ldots \frac{e^{(-\frac{1}{2}(p-\mu)^T \Sigma^{-1}(p-\mu))}}{\sqrt{(2\pi)^n |\Sigma|}} \, dp_1 \, dp_2 \ldots dp_n,$$

where U is used to denote USL, L is used to denote LSL, and n denotes the number of locations where the quality indicative parameter are monitored in the yield prediction process and $\Phi$ denotes the joint distribution of the variation of the quality indicative parameter at these n locations.

The joint distribution $\Phi$ of the n-dimensional random variable vector p at the n locations in above equation can be written as:

$$\Phi(p) = \frac{e^{(-0.5(p-\mu)^T \Sigma^{-1}(p-\mu))}}{\sqrt{(2\pi)^n |\Sigma|}},$$

where $|\Sigma|$ is the determinant of the covariance matrix.

Note that there is no explicit solution for Y, hence a numerical integration is needed. Consider a typical chip die dimension of 1 cm×1 cm, and a typical tile size of 10 μm×10 μm which is desirable to accurately represent the systematic variations, computing Y then involves a 1000×1000-dimensional integration. Unfortunately, a direct numerical integration of the probability Y with a dimension n in an order of $10^6$ is intractable if not impossible. It would require: a large amount of computation time, and a huge amount of memory, without guaranteeing a numerical accuracy. A technique developed by Genz (see A. Genz, "Numerical computation of multivariate normal probabilities", *Journal of Computational and Graphical Statistics*, Vol. 1, pp. 141-149, 1992) which utilizes a sequence of transformations to reduce the order of integration only partially helps to solve the problem.

Figure 5:
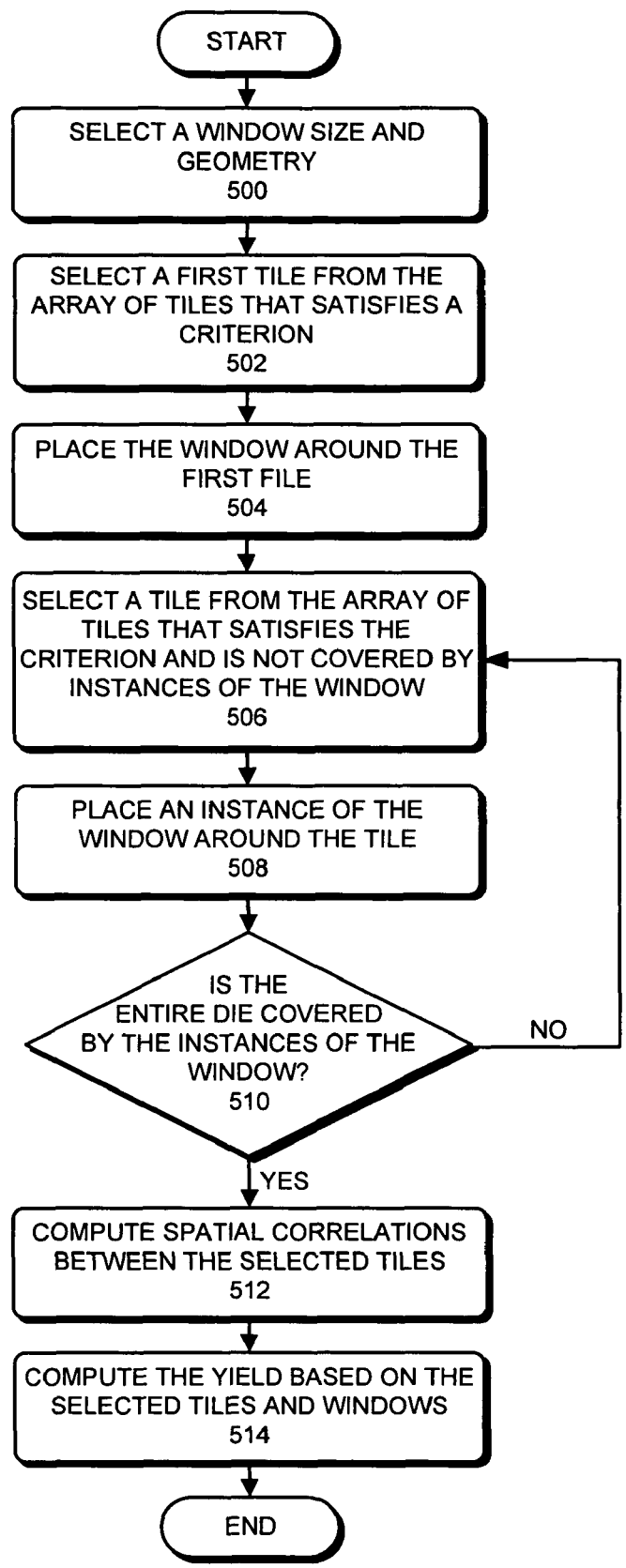
FIG. 5 presents a flowchart illustrating a process of reducing computational complexity involved in predicting a manufacturing yield in accordance with an embodiment of the present invention.

FIG. 5 presents a flowchart illustrating a process of reducing computational complexity involved in predicting manufacturing yield in accordance with an embodiment of the present invention.

As discussed previously, the distance at which any two locations have an almost-perfect spatial correlation, e.g. a correlation coefficient >0.950, may be much larger than the distance at which any two locations have near-equal nominal values. The distance at which an almost-perfect correlation exists between any two locations in a die is referred to as a "perfect-correlation distance". In other word, the perfect-correlation distance can be much larger than the distance between neighboring tiles.

During operation, the system starts by selecting a window with a specific geometry and size which is larger than the size of the tile (step 500). In one embodiment of the present invention, the window geometry is a circle and the window size is the radius of the circle. Additionally, the size of the window can be determined based on the perfect-correlation distance, which can be extracted from the measurement data obtained from the test structures as discussed previously. Note that the size of the window can be larger than, smaller than, or equal to the perfect-correlation distance depending on the prediction accuracy needed and how quickly the correlation decreases with the distance. Also note that the window geometry is not limited to circles; other geometries can also be used.

Next, the system selects a first tile from the array of tiles across the die which satisfies a specific criterion (step 502). In one embodiment of the present invention, the criterion can be either a maximum nominal value or a minimum nominal value for the process parameter across the die. The system then places an instance of the window around the first tile (step 504). In one embodiment of the present invention, the window is placed so that the tile is in the center of the window.

The system next selects a tile from the array of tiles which satisfies the criterion and is not covered by the window surrounding the first tile (step 506). The system subsequently places an instance of the window around the tile in the same manner as the first tile (step 508).

Next, the system determines whether the entire die is covered by the instances of the window (step 510). If not so, the system repeats steps 506, 508 and 510 until the entire die is covered by the instances of the window. When the above iterative procedure is complete, the nominal values for the quality indicative parameter at all the selected tile locations, and the spatial correlations between these locations (i.e. functions of their relative distances) can be obtained (step 512), and subsequently used to construct the covariance matrix.

The system then obtains the manufacturing yield for the die based on the systematic variations, the random variations and the spatial correlation of the random variations between the selected tiles (step 514). Note that the computation complexity in the above-described process is significantly less than using original tiles because the dimension of integration is much less due to the large window size used.

Figure 6:
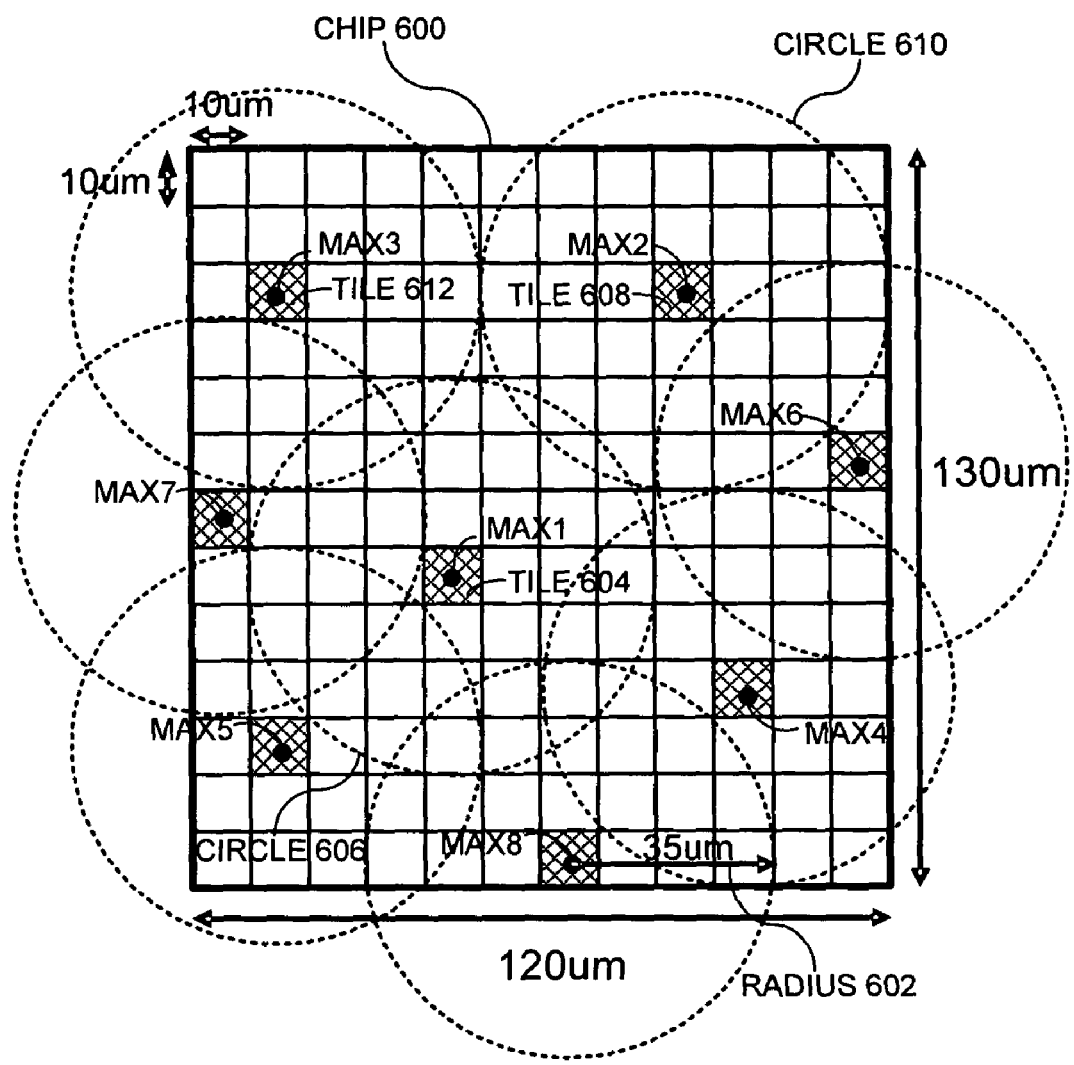
FIG. 6 illustrates an exemplary process for computing manufacturing yield by using a perfect-correlation window in accordance with an embodiment of the present invention.

FIG. 6 illustrates an exemplary process for computing the manufacturing yield by using the perfect-correlation window in accordance with an embodiment of the present invention. We use an exemplary chip (600) with a size of 120 μm×130 μm for the convenience of description. Chip 600 is first meshed into 10 μm×10 μm tiles. The distance in which any two locations have an almost-perfect correlation is assumed to be 3.5 times of the tile size, which is bounded by the circular window with a radius 602 of 35 μm as shown in FIG. 6. A much larger radius 602 may be used depending on the prediction accuracy needed and how quickly the correlation decreases with the distance. Here, we use a relatively small distance simply for ease of description.

The nominal values for the quality indicative parameter at all the tiles can be obtained by using a simulator. Then, the maximum nominal value across the whole chip is denoted as MAX1 within tile 604. Next, the largest nominal value outside of circle 606 which encircled tile 604 is denoted as MAX2 within tile 608. The largest nominal value outside of the union of circle 606 and circle 610 surrounding MAX2 is denoted as MAX3 within tile 612. The above procedure is continued until the whole chip is covered by the circles of radius 602. As shown in FIG. 6, the whole chip is covered by 8 circles surrounding 8 maximum locations from MAX1 to MAX8.

We assume that the almost-perfect correlation across any of the 8 circles to be a perfect correlation of 1, which means that the quality indicative parameter values at all locations within a circle keep co-varying and the variation amounts are the same everywhere within the circle. Consequently, the probability that all the tiles within each of the 8 circles have smaller than USL values can be determined by the 8 tiles that enclose MAX1 to MAX8 respectively. As a result, the nominal values MAX1 to MAX8 at the 8 maximum locations as well as the spatial correlations between the 8 locations which are functions of their relative distances can be obtained.

Further because of the perfect correlation within the perfect correlation circles, the probability for the 8 maximum locations to fall below the USL is close to the probability for all the locations (tiles) in the chip to fall below the USL. We denote the probability that all locations fall below the USL as $Y_{max}$.

More specifically, knowing the nominal values MAX1 to MAX8 at the 8 maximum locations and the correlations between the 8 locations, we can construct the correlation matrix $\rho_{max}$ for the 8 locations, the covariance matrix $\Sigma_{max}$, and subsequently compute their joint distribution $\Phi_{max}(p)$. Then $Y_{max}$ is:

$$Y_{max} = \int_{-\infty}^{U} \int_{-\infty}^{U} \int_{-\infty}^{U} \ldots \Phi_{max}(p) dp_1 dp_2 \ldots dp_8.$$

A similar method can be used to evaluate the probability $Y_{min}$ that all locations in the chip fall above the LSL by placing another group of perfect correlation circles around the tiles with minimal process parameter values, then:

$$Y_{min} = \int_L^\infty \int_L^\infty \int_L^\infty \ldots (p) dp_1 dp_2 \ldots dp_8.$$

Finally, the manufacturing yield Y can be obtained by:

$$Y = Y_{max} + Y_{min} - 1.$$

Note that the size of the correlation matrix is 8×8, which is significantly smaller than the size 12×13×12×13 or 156×156 of the original correlation matrix using only the tiles. For the chip with the 1 cm×1 cm dimension, the size of the correlation matrix may be reduced from $10^6 \times 10^6$ to ~26K×26K which is much more tractable. Note that when the perfect-correlation distance is increased from the 35 μm to 200 μm, the size of the correlation matrix will be further reduced to 2500×2500.

EXAMPLE

Cu Thickness in Chemical Mechanical Planerization (CMP)

During IC manufacturing, a quality characteristic is often used to describe or monitor the quality of an IC fabrication process, such as the CD in a lithography process and Cu thickness in a CMP process. In the following discussion, Cu thickness in CMP is used as an example. However, the discussion below is also applicable to other IC manufacturing process parameters.

Ideally, a CMP process should yield a constant Cu thickness across a wafer. Practically, the Cu thickness at any given location on the wafer is affected by a number of process variables as well as design variables. The process variables can include the incoming Cu deposition thickness, barrier deposition thickness, Cu polishing rate, barrier polishing rate, CMP down pressure, velocity and so on. The design parameters can include the layout density, layout perimeter sum, line width and so on. All of these process and design parameters vary at different scales in time and space: from lot-to-lot, wafer-to-wafer, die-to-die and intra-die.

Note that the lot-to-lot and wafer-to-wafer variations are typically regarded as temporal variations for CMP and can be assumed to be independent of intra-die locations. On the other hand, the "die-to-die" variation is a spatial variation, which includes a systematic component as well as a random component. Because the area of a die is relatively small compared to the wafer, similar to that in the case of lot-lot variation and wafer-wafer variations, it is reasonable to assume an identical wafer-level variations across the die in the wafer.

The intra-die variation is a spatial variation. Similar to the die-to-die variation, it can be separated into two components. One is the systematic spatial variation which is usually caused by the layout dependency of the CMP process. An example of this variation is the pattern density dependency of the intra-die oxide thickness and Cu thickness distribution in the CMP process. Typically, a physical simulator can be used to evaluate this systematic variation. The other component in the intra-die variation is a random variation, which is associated with the manufacturing process. Note that the random intra-die variation across the die can be either spatially correlated or independent.

As mentioned previously, in order to produce a yield based on the Cu thickness from the CMP process, Cu thickness should fall within a range bounded by an upper specification limit (USL) and a lower specification limit (LSL). We have previously defined the probability that the all Cu thickness across the chip falls between USL and LSL as the yield of Cu CMP. Note that when ignoring the systematic die-to-die variations, wafer-wafer and lot-lot variations, the chip yield per wafer will be equal to the above-defined yield times the number of chips per wafer.

Figure 7:
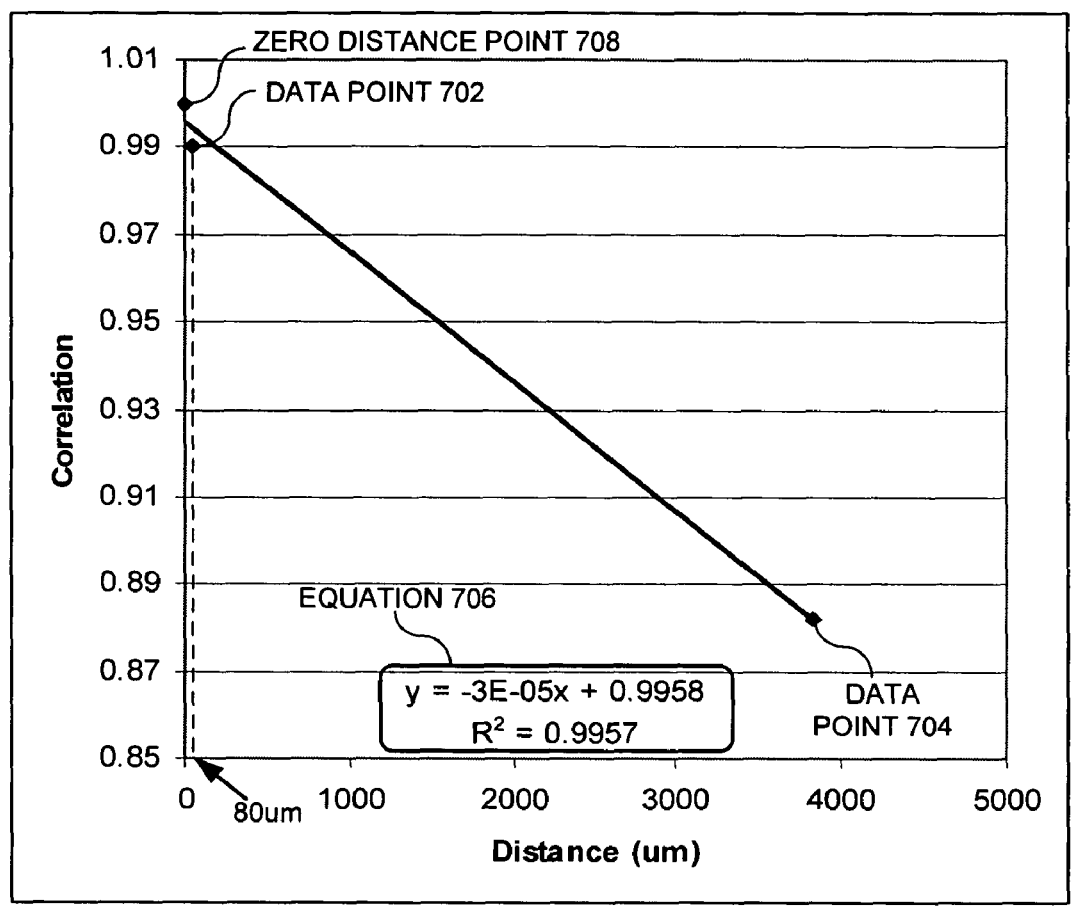
FIG. 7 illustrates spatial correlations of random variations of Cu thickness as a function of distances across a die in accordance with an embodiment of the present invention.

Next, the perfect-correlation distance for the correlation of post-CMP Cu thicknesses can be obtained from manufacturing data. FIG. 7 illustrates the spatial correlations of random variations of Cu thickness as a function of distances across a die in accordance with an embodiment of the present invention. In one case, a high correlation of 0.99 (data point 702) is obtained for two intra-die locations which are 80 µm away from each other. Additionally, a relatively lower correlation of 0.88 (data point 704) is obtained for another two intra-die locations which are around 4000 µm away from each other. Furthermore, we assume a linear reduction of the correlation with distances across the die. Hence, a function describing the linear relationship can be obtained (equation 706). Note that in FIG. 7 there is a default third location 708 which corresponds to a zero distance and perfect correlation of 1.

After knowing the correlation between n different locations as a function of distances, the n×n dimensional covariance or correlation matrix can be obtained. The yield can then be computed using the formulations described previously.

Next, a chip with size 8.277 mm×9.258 mm is used to demonstrate the efficiency of the proposed yield prediction technique. The USL, nominal and LSL values of the Cu thickness are set as 4700 A, 3200 A and 1700 A based on the data from manufacturing. The standard deviation of the Cu thickness variation is measured to be ~120 A. We assume a linear reduction of the correlation with the distance and the equation in FIG. 7 is used.

Table 1 shows the yield prediction results under different perfect-correlation distances. It can be seen that the yield prediction converges to 80% at a distance of 1000 µm. Therefore, 1000 µm can be chosen as the perfect-correlation distance for both efficient and accurate yield predictions. Note that the optimal distances change with the correlation function, which is primarily determined by the process.

CONCLUSION

The data structures and code described in the foregoing description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Furthermore, the foregoing descriptions of embodiments of the present invention have been presented only for purposes of illustration and description. They are not intended to be exhaustive or to limit the present invention to the forms disclosed. Accordingly, many modifications and variations will be readily apparent. Additionally, the above disclosure is not intended to limit the present invention. The scope of the present invention is defined by the appended claims.

TABLE 1

| Perfect Correlation Distance (µm) | Yield (%) | CPU Time (seconds) | Circle Number |
|---|---|---|---|
| 5000 | 86.72 | 24.42 | 1 |
| 4000 | 82.29 | 37.6 | 6 |
| 3000 | 82.28 | 42.33 | 8 |
| 2000 | 81.17 | 166.29 | 55 |
| 1000 | 80.35 | 249.58 | 86 |
| 500 | 80.57 | 446.92 | 153 |
| 400 | 80.85 | 856.1 | 290 |
| 350 | 80.98 | 1345.8 | 432 |

What is claimed is:

1. A method for predicting a manufacturing yield for a die within a semiconductor wafer, the method comprising:
   receiving a physical layout of the die;
   partitioning the die into an array of tiles;
   computing systematic variations for a quality indicative parameter across the array of tiles based on the physical layout of the die, which includes:
      performing a physical layout extraction across the array of tiles; and
      determining values for the quality indicative parameter based at least on results of the physical layout extraction;
   applying a random variation for the quality indicative parameter to each tile in the array of tiles;
   iteratively placing instances of a window in the die until the die is covered with instances of the window, wherein each iteration includes,
      selecting a tile from the array of tiles which satisfies a criterion and is not covered by an instance of the window, and
      placing an instance of the window around the selected tile;
   computing spatial correlations for the random variations between the selected tiles; and
   computing the manufacturing yield for the die based at least on the systematic variations, the random variations, and the spatial correlations for the random variations.

2. The method of claim 1, wherein computing the manufacturing yield for the die includes:
   receiving specification limits for the quality indicative parameter;
   computing a joint probability distribution for the selected tiles which indicate whether the selected tiles satisfy the specification limits; and
   obtaining the manufacturing yield for the die from the joint probability distribution.

3. The method of claim 1, wherein computing the spatial correlations for the random variations between the selected tiles includes:
   obtaining measurement data from test structures; and
   extracting correlation coefficients as a function of a distance between the tiles from the measurement data.

4. The method of claim 3, wherein computing the spatial correlations for the random variations between the selected tiles includes using the correlation coefficients to construct a covariance matrix for the instances of the window.

5. The method of claim 1, wherein the criterion is either a maximum value or a minimum value for the quality indicative parameter.

6. The method of claim 1, wherein a size of the window is such that any two tiles within a window have a spatial correlation coefficient that is substantially equal to unity.

7. A non-transitory computer-readable storage medium storing instructions that when executed by a computer cause the computer to perform a method for predicting a manufacturing yield for a die within a semiconductor wafer, the method comprising:
receiving a physical layout of the die;
partitioning the die into an array of tiles;
computing systematic variations for a quality indicative parameter across the array of tiles based on the physical layout of the die, which includes:
performing a physical layout extraction across the array of tiles; and
determining values for the quality indicative parameter based at least on results of the physical layout extraction;
applying a random variation for the quality indicative parameter to each tile in the array of tiles;
iteratively placing instances of a window in the die until the die is covered with instances of the window, wherein each iteration includes,
selecting a tile from the array of tiles which satisfies a criterion and is not covered by an instance of the window, and
placing an instance of the window around the selected tile;
computing spatial correlations for the random variations between the selected tiles; and
computing the manufacturing yield for the die based at least on the systematic variations, the random variations, and the spatial correlations for the random variations.

8. The non-transitory computer-readable storage medium of claim 7, wherein computing the manufacturing yield for the die includes:
receiving specification limits for the quality indicative parameter;
computing a joint probability distribution for the selected tiles which indicate whether the selected tiles satisfy the specification limits; and
obtaining the manufacturing yield for the die from the joint probability distribution.

9. The non-transitory computer-readable storage medium of claim 7, wherein computing the spatial correlations for the random variations between the selected tiles includes:
obtaining measurement data from test structures; and
extracting correlation coefficients as a function of a distance between the tiles from the measurement data.

10. The non-transitory computer-readable storage medium of claim 9, wherein computing the spatial correlations for the random variations between the selected tiles includes using the correlation coefficients to construct a covariance matrix for the instances of the window.

11. The non-transitory computer-readable storage medium of claim 7, wherein the criterion is either a maximum value or a minimum value for the quality indicative parameter.

12. The non-transitory computer-readable storage medium of claim 7, wherein a size of the window is such that any two tiles within a window have a spatial correlation coefficient that is substantially equal to unity.

13. An apparatus for predicting a manufacturing yield for a die within a semiconductor wafer, the apparatus comprising:
a receiving mechanism configured to receive a physical layout of the die;
a partitioning mechanism configured to partition the die into an array of tiles;
a first computing mechanism configured to compute systematic variations for a quality indicative parameter across the array of tiles based on the physical layout of the die, wherein the first computing mechanism is configured to:
perform a physical layout extraction across the array of tiles; and
determine values for the quality indicative parameter based at least on results of the physical layout extraction;
an applying mechanism configured to apply a random variation for the quality indicative parameter to each tile in the array of tiles;
a placing mechanism configured to iteratively place instances of a window in the die until the entire die is covered with instances of the window, wherein each iteration includes,
selecting a tile from the array of tiles which satisfies a criterion and is not covered by an instance of the window, and
placing an instance of the window around the selected tile;
a second computing mechanism configured to compute spatial correlations for the random variations between the selected tiles; and
a third computing mechanism configured to compute the manufacturing yield for the die based at least on the systematic variations, the random variations, and the spatial correlations for the random variations.

14. The apparatus of claim 13, wherein the third computing mechanism is configured to:
receive specification limits for the quality indicative parameter;
compute a joint probability distribution for the selected tiles which indicate whether the selected tiles satisfy the specification limits; and
obtain the manufacturing yield for the die from the joint probability distribution.

15. The apparatus of claim 13, wherein the second computing mechanism is configured to:
obtain measurement data from test structures; and
extract correlation coefficients as a function of a distance between the tiles from the measurement data.

16. The apparatus of claim 15, wherein the second computing mechanism is configured to use the correlation coefficients to construct a covariance matrix for the instances of the window.

17. The apparatus of claim 13, wherein the criterion is either a maximum value or a minimum value for the quality indicative parameter.

18. The apparatus of claim 13, wherein a size of the window is such that any two tiles within a window have a spatial correlation coefficient that is substantially equal to unity.

* * * * *